(12) United States Patent
Minasian

(10) Patent No.: US 6,298,741 B1
(45) Date of Patent: Oct. 9, 2001

(54) ACTUATOR WITH DUAL OPERATING OUTPUTS

(75) Inventor: Henry Minasian, Weymouth, MA (US)

(73) Assignee: Joseph Pollak Corporation, Boston, MA (US)

( * ) Notice: Subject to any disclaimer, the term of this patent is extended or adjusted under 35 U.S.C. 154(b) by 0 days.

(21) Appl. No.: 09/306,146

(22) Filed: May 6, 1999

Related U.S. Application Data
(60) Provisional application No. 60/084,433, filed on May 6, 1998.

(51) Int. Cl.⁷ .............................. F16H 1/12; F16H 1/20
(52) U.S. Cl. ................................. 74/421 A; 74/665 GA
(58) Field of Search ................... 74/421 A, 625, 74/665 GA, 665 GD, 665 G, 665 F

(56) References Cited

U.S. PATENT DOCUMENTS

| | | | |
|---|---|---|---|
| 4,628,764 | * 12/1986 | Chisaka et al. | 74/625 |
| 4,754,660 | * 7/1988 | Kobayashi et al. | 74/427 |
| 5,213,010 | * 5/1993 | Hayafusa et al. | 74/665 GA |
| 5,463,914 | * 11/1995 | Tyan | 74/661 |
| 5,740,696 | * 4/1998 | Jean et al. | 74/354 |

FOREIGN PATENT DOCUMENTS 3-10861 * 1/1991 (JP).
5-188450 * 7/1993 (JP).

* cited by examiner

Primary Examiner—Sherry Estremsky
Assistant Examiner—Tisha D. Lewis
(74) Attorney, Agent, or Firm—Hayes, Soloway, Hennessey, Grossman, & Hage, P.C.

(57) ABSTRACT

An actuator for driving two separate gear trains having separate loads. The actuator includes: a drive motor; a drive gear attached to an output shaft of the drive motor; and first and second mating gears in meshing engagement with the drive gear. The first mating gear is axially fixed relative to the drive gear and adapted for driving the first gear train. The second mating gear is axially movable relative to the drive gear and adapted for driving the second gear train. Upon application of power to the drive motor, the first mating gear drives the first gear train, and the second mating gear drives the second drive train. The second mating gear is adapted to travel axially relative to the second gear train for disengaging therefrom when a load causes the second gear train to stall. The first mating gear may continue to drive the first gear train to stall. The actuator may be rotatable about an axis common to the drive motor to engage the first and second mating gears with the first and second drive trains, respectively, when power is applied to the motor. A spring may be provided for rotating the actuator and disengaging the first and second mating gears from the first and second drive trains when power is removed from the motor.

10 Claims, 2 Drawing Sheets

ACTUATOR WITH DUAL OPERATING OUTPUTS

CROSS REFERENCE TO RELATED APPLICATIONS

The present application claims the benefit of U.S. provisional application Ser. No. 60/084,433 filed May 6, 1998, the teachings of which are incorporated herein by reference.

FIELD OF THE INVENTION

The present invention relates to a motor-driven actuator, and, more particularly, to an actuator with dual operating outputs to control two different functions with a single drive motor.

BACKGROUND OF THE INVENTION

In prior art actuator designs each output actuation is powered by a separate driving electric motor. The need for separate driving motors directly affects the cost of such designs and the space required for installation of such designs. In addition, where multiple elements in a system must be driven, means for switching power between separately driven actuators must be incorporated into the system.

Accordingly, there is a need in the art for a single, low-cost motor that can provide two output actuating forces to two different elements, sequentially, without switching power or using other powering devices such as coils or magnets. The device of the present invention automatically disconnects the driving element from one gear train while continuing to drive the driving element of a second gear train to cycle completion using a single drive motor.

OBJECTS OF THE INVENTION

Thus, it is an object of the present invention to provide an actuator having a single motor which provides two actuating forces to two different elements sequentially, without switching power or using other powering devices.

It is another object of the present invention to provide an actuator which reduces the cost of systems requiring two actuating forces.

These and other objects of the present invention will become apparent from a review of the description provided below.

SUMMARY OF THE INVENTION

The present invention is organized about the concept of providing an actuator which can drive two separate gear trains having separate loads. In particular, the actuator includes: a drive motor; a drive gear attached to an output shaft of the drive motor; and first and second mating gears in meshing engagement with the drive gear. The first mating gear is axially fixed relative to the drive gear and adapted for driving the first gear train. The second mating gear is axially movable relative to the drive gear and adapted for driving the second gear train. Upon application of power to the drive motor, the first mating gear drives the first gear train, and the second mating gear drives the second drive train. The second mating gear is adapted to travel axially relative to the second gear train for disengaging therefrom when a load causes the second gear train to stall. Meanwhile, the first mating gear may continue to drive the first gear train to stall. The actuator according to the invention may, therefore, be used to drive two gear trains using a single motor. For example, the actuator may be used to drive a "lock-unlock" gear train and a "release" gear train in the locking mechanism of an automotive door, e.g., a minivan side door.

In one embodiment, the drive gear is a 12-tooth high helix angel pinion gear, and the first and second mating gears are 15-tooth gears driven at 180 degrees to the drive gear on a common center line, parallel axis, and common center-to-center distance. Also, the actuator may be rotatable about an axis common to the drive motor to engage the first and second mating gears with the first and second drive trains, respectively, when power is applied to the motor. A spring, e.g., a torsion spring, may be provided for rotating the actuator and disengaging the first and second mating gears from the first and second drive trains when power is removed from the motor. There is also provided a method of driving first and second separate gear trains which includes providing an actuator according to the invention and applying power to the drive motor.

BRIEF DESCRIPTION OF THE DRAWING

A preferred embodiment of the invention is described below with reference to the following figures wherein like numerals represent like parts.

DETAILED DESCRIPTION OF THE INVENTION

Figure 1:
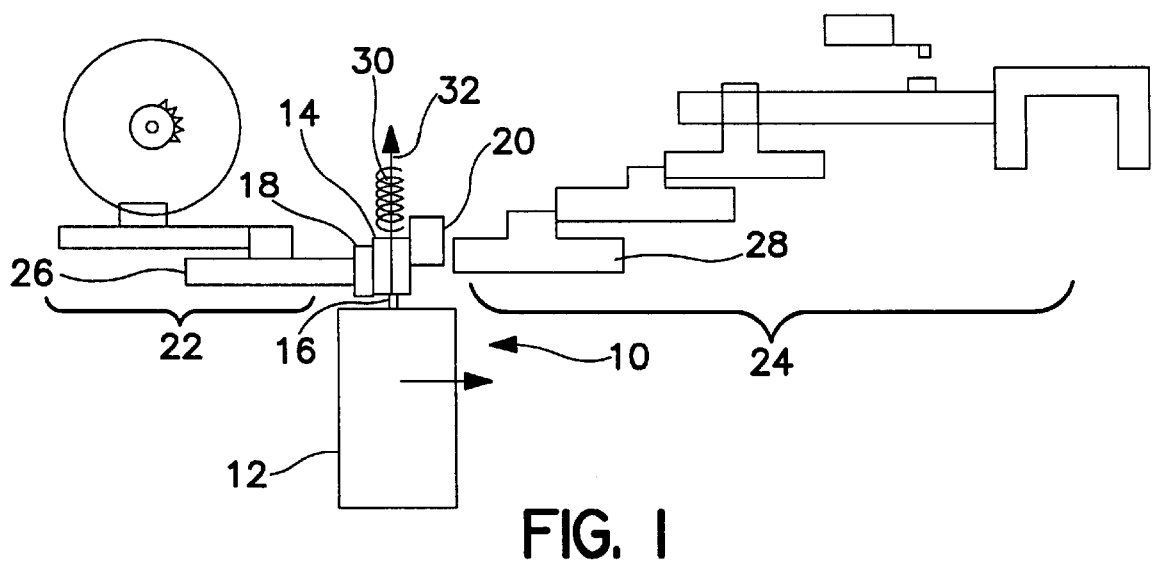
FIGS. 1: is a top view of a portion of a system incorporating an actuator according to the invention.
Figure 2:
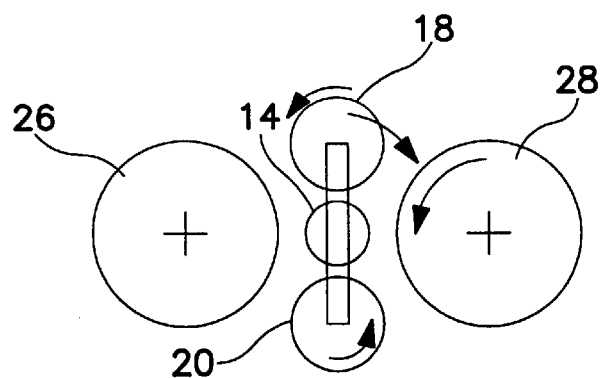
FIG. 2: is a side view of a portion of a system incorporating an actuator according to the invention which shows and describes system operation.
Figure 3:
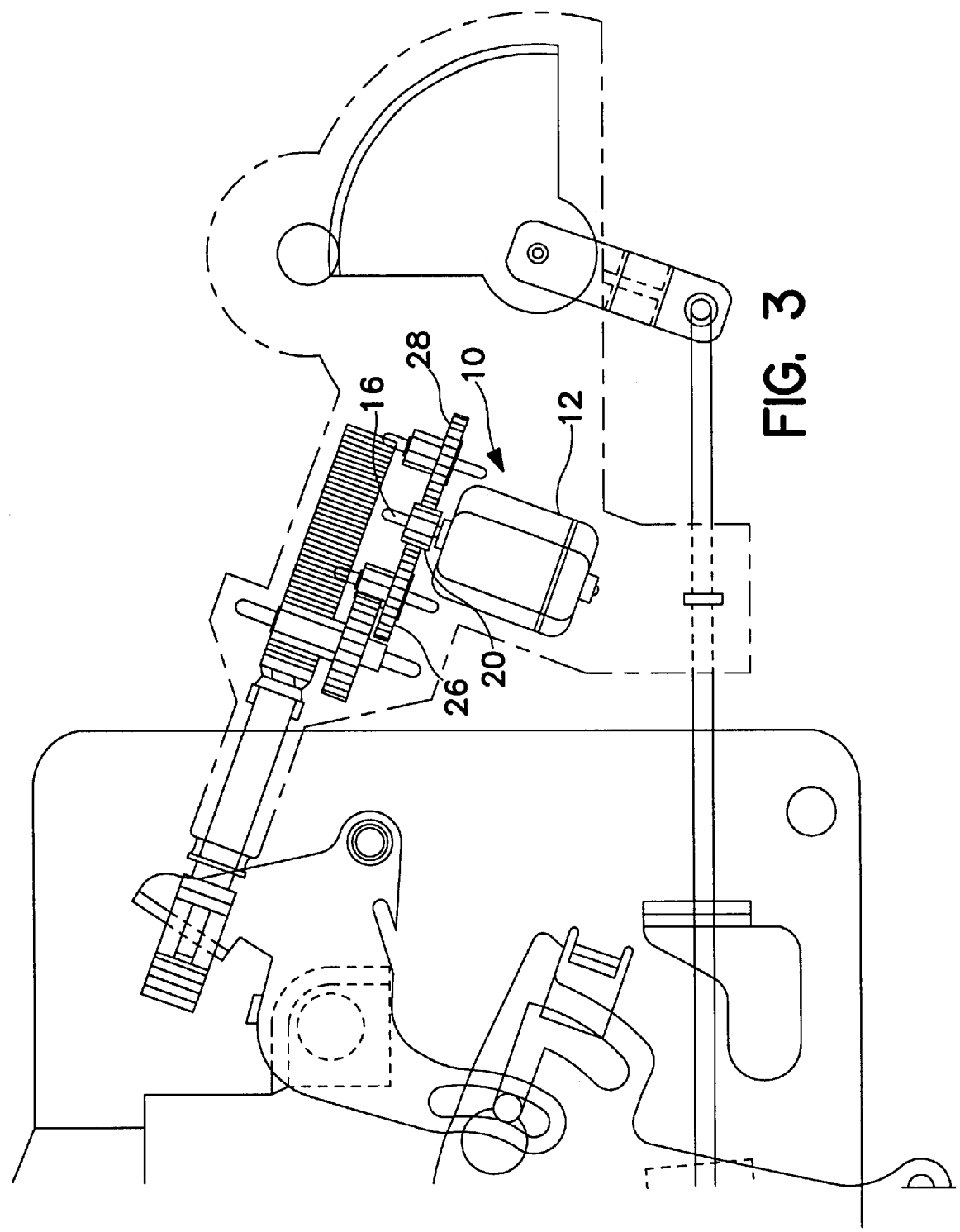
FIG. 3: is a partial perspective view of a system including a dual actuator according to the invention.

Referring now to FIGS. 1–3, a preferred embodiment of an actuator 10 according to the invention is shown. The actuator generally includes a drive motor 12, a drive gear 14 coupled to the output shaft 16 of the drive motor, and first 18 and second 20 mating gears in meshing engagement with the drive gear 14. The mating gears are adapted for driving separate gear trains, e.g. 22, 24, respectively. Gear train 22 may be, for example, a "release" gear train for a minivan side door, while gear train 24 may be a "lock-unlock" gear train for the minivan side door.

Those skilled in the art will recognize that the drive gear 14 may take a variety of forms depending on the application. In one embodiment, however, the drive gear 14 is a 12-tooth high helix angle helical pinion gear. The mating gears 18, 20 are driven at 180 degrees to the drive gear gear on a common center line, parallel axis, and common center-to-center distance, and may have, for example 15 teeth.

Advantageously, the mating gears 18, 20 differ slightly in that one 18 is fixed axially and the other 20 is allowed to float axially a distance sufficient to remove the meshing engagement of the mating gear 20 in a timed manner, as described below. Generally, the axial travel of the gear 20 may be in the range of from about 4 to 5 millimeters in the preferred embodiment. Those skilled in the art will recognize, however, that the required axial travel of the gear 20 will vary depending on the physical characteristics of the gears 20 and 28.

When no power is applied to the motor, both mating gears 18, 20 are disengaged from the first gears 26, 28, as illustrated in FIG. 2. However, the assembly is adapted to rotate about an axis 32 common to the motor when power is applied for causing the mating gears 18, 20 to engage first gears 26, 28. When power is removed, the assembly is returned to a central location by means of a spring 30.

In operation, when power is applied to the motor 12, the torsional windup of the drive gear 14 coupled with frictional losses in the mating gears 18, 20 causes a moment to be created. This moment causes rotation of the assembly about the axis 32, and engagement of the mating gears 18, 20 with their associated first gears 26, 28, respectively, of the gear trains 22, 24. The gear train 24 will be described as the "lock-unlock system" and the second gear train will be described as the "release" system.

The gear train 22 may be designed with lost motion such that it can travel a distance equal to the travel distance of the gear train 24 without encountering the load of the gear train 24. When the gear train 24 reaches end of stroke and the system begins to stall, an axial thrust is developed causing the mating gear 20 (i.e. the gear adapted for axial movement) to slide out of engagement with the first gear 28 of the gear train 24. The system is timed such that the gear train 22 is coming under load, and because of some frictional losses the gear 18 remains in mesh with gear 26 driving the gear train 22 to a stall condition.

At this point, the power can be manually released or a thermal limiting device will interrupt the power supply. When power is released, the spring 30 returns the assembly to its center position, as shown in FIG. 1. The system is, therefore, reset. If the "lock-unlock" condition is already met through manual intervention, then the 20 gear develops a stall torque and slide out of engagement with the gear 28. The gear 18, however, continues to drive gear train 22 through gear 26.

Thus, the present invention provides the ability to drive two separate and different forces, different distances and in sequence to one another. If a first condition is met by manual intervention, the system can detect the state of condition and provide the second half of the required function. The system can provide only the first function in forward or reverse without effecting the causing function of the second. Advantageously, reduced cost is achieved by decreasing the number of electric motors required through the combination of two separate gear trains with one electric drive motor. The embodiments which have been described herein, however, are but some of the several which utilize this invention and are set forth here by way of illustration but not of limitation. It is obvious that many other embodiments which will be readily apparent to those skilled in the art may be made without departing materially from the spirit and scope of this invention.

What is claimed is:

1. An actuator comprising:
    a drive motor;
    a drive gear attached to an output shaft of said drive motor; and
    first and second mating gears in meshing engagement with said drive gear, said first mating gear being axially fixed relative to said drive gear and adapted for driving a first gear train, and said second mating gear being axially movable relative to said drive gear and adapted for driving a second gear train, said second gear train being separate from said first gear train; and
    wherein upon application of power to said drive motor said first mating gear drives said first gear train and said second mating gear drives said second drive train, and
    wherein said second mating gear is adapted to travel axially relative to said second gear train for disengaging therefrom when a load stalls said second gear train.

2. An actuator according to claim 1, wherein said drive gear is a 12-tooth high helix angel pinion gear.

3. An actuator according to claim 1, wherein said first and second mating gears have 15 teeth and are driven at 180 degrees to said drive gear on a common center line, parallel axis, and common center-to-center distance.

4. An actuator according to claim 1, wherein said actuator is rotatable about an axis common to said drive motor to engage said first and second mating gears with said first and second drive trains, respectively, when power is applied to said motor.

5. An actuator according to claim 4, said actuator further comprising a spring for disengaging said first and second mating gears from said first and second drive trains when power is removed from said motor.

6. A method of driving first and second separate gear trains comprising:
    providing an actuator, said actuator comprising,
        a drive motor;
        a drive gear attached to an output shaft of said drive motor; and
        first and second mating gears in meshing engagement with said drive gear, said first mating gear being axially fixed relative to said drive gear and adapted for driving said first gear train, and said second mating gear being axially movable relative to said drive gear and adapted for driving said second gear train, said second gear train being separate from said first gear train; and
    wherein upon application of power to said drive motor said first mating gear drives said first gear train and said second mating gear drives said second drive train, and
    wherein said second mating gear is adapted to travel axially relative to said second gear train for disengaging therefrom when a load stalls said second gear train; and
    applying power to said motor.

7. A method according to claim 6, wherein said drive gear is a 12-tooth high helix angel pinion gear.

8. A method according to claim 6, wherein said first and second mating gears have 15 teeth and are driven at 180 degrees to said drive gear on a common center line, parallel axis, and common center-to-center distance.

9. A method according to claim 6, wherein said actuator is rotatable about an axis common to said drive motor to engage said first and second mating gears with said first and second drive trains, respectively, when power is applied to said motor.

10. A method according to claim 9, said actuator further comprising a spring for disengaging said first and second mating gears from said first and second drive trains when power is removed from said motor.

* * * * *